(12) United States Patent
Prat et al.

(10) Patent No.: US 8,564,573 B2
(45) Date of Patent: Oct. 22, 2013

(54) METHOD FOR DETECTING A FLEXION EXERTED ON A FLEXIBLE SCREEN AND DEVICE EQUIPPED WITH SUCH A SCREEN FOR IMPLEMENTING THE METHOD

(75) Inventors: Christopher Prat, Nantes (FR); Nadine Patry, Rennes (FR); Philippe Le Roy, Betton (FR)

(73) Assignee: Thomson Licensing, Boulogne, Billancourt (FR)

( * ) Notice: Subject to any disclaimer, the term of this patent is extended or adjusted under 35 U.S.C. 154(b) by 1040 days.

(21) Appl. No.: 12/150,337

(22) Filed: Apr. 25, 2008

(65) Prior Publication Data
US 2008/0278461 A1 Nov. 13, 2008

(30) Foreign Application Priority Data
Apr. 27, 2007 (FR) .................................. 07 54765

(51) Int. Cl.
*G06F 3/042* (2006.01)
(52) U.S. Cl.
USPC .......................................... 345/176; 345/173
(58) Field of Classification Search
USPC .................................................. 345/173–176
See application file for complete search history.

(56) References Cited

U.S. PATENT DOCUMENTS

| 4,346,376 | A | | 8/1982 | Mallos | |
|---|---|---|---|---|---|
| 4,484,179 | A | * | 11/1984 | Kasday | ........................ 345/176 |
| 7,442,914 | B2 | * | 10/2008 | Eliasson et al. | ............... 250/221 |
| 2005/0040962 | A1 | | 2/2005 | Funkhouser | |
| 2006/0001653 | A1 | * | 1/2006 | Smits | ............................. 345/176 |
| 2006/0279558 | A1 | * | 12/2006 | Van Delden et al. | ......... 345/176 |
| 2008/0007518 | A1 | * | 1/2008 | Majumdar et al. | ............ 345/156 |
| 2008/0007540 | A1 | * | 1/2008 | Ostergaard | .................... 345/176 |
| 2009/0128499 | A1 | * | 5/2009 | Izadi et al. | .................... 345/173 |
| 2009/0135162 | A1 | * | 5/2009 | Van De Wijdeven et al. | 345/175 |

FOREIGN PATENT DOCUMENTS

| EP | 0144088 | 6/1985 |
|---|---|---|
| FR | 2480967 | 10/1981 |
| JP | 2001337623 | 7/2001 |
| WO | WO86/03618 | 6/1986 |
| WO | WO2005/026938 | 3/2005 |
| WO | WO2006/134552 | 12/2006 |

OTHER PUBLICATIONS

Search Report dated Aug. 23, 2007.

* cited by examiner

*Primary Examiner* — Christopher E Leiby
(74) *Attorney, Agent, or Firm* — Jeffrey D. Carter

(57) ABSTRACT

Present day, technology allows flexible screens to be produced, particularly the OLED screen technology. The invention relates to a device equipped with a flexible screen emitting light. Part of the light rays emitted by the optical cells is imprisoned between the substrate layers and reflecting from one layer to the other exit at the side of the screen. Photoelectric detectors are arranged on the side of the screen in order to capture the incident light. Depending on the position of the cells emitting the light and the values supplied by the detectors, the central processing unit determines the areas of flexion applied to the screen. Hence, it is possible to introduce commands by exerting flexions on certain areas of the screen. The invention also relates to a device having a flexible screen and flexion sensors capable of executing the method for the introduction of commands.

20 Claims, 3 Drawing Sheets

METHOD FOR DETECTING A FLEXION EXERTED ON A FLEXIBLE SCREEN AND DEVICE EQUIPPED WITH SUCH A SCREEN FOR IMPLEMENTING THE METHOD

This application claims the benefit, under 35 U.S.C. §119 of FR Patent Application 0754765, filed 27 Apr. 2007.

FIELD OF THE INVENTION

The invention relates to a method of detecting the flexion of a screen displaying a picture and a device having such a screen to implement the method.

BACKGROUND

These days, a large number of communications are conducted by optical fiber. A photo-emitter emits a light at the interior of the optical fiber manufactured in a translucent material. The light is then reflected on the internal walls of the fiber and exits at one end where it is captured by a photoreceptor. The fiber does not need to be maintained in a straight line, due to a sufficient reflection index, the light is reflected on the internal walls of the fiber and continues its path to the end.

In another domain, it is necessary to know the deformations of a solid body. For example, the deformation of metal girders is detectable by the variation of the value of resistive nets attached to them. The value of the resistance varies more or less according to the direction of the flexion.

In another domain, compression sensors are known, such as those intended for use on a tactile screen. Layers of compressible substrates constitute a capacitor in which the dielectric constant varies if the intermediate layer is compressed. The substrate layers are deposited onto the lower face of the screen and delimit the areas. The perimeter of these areas appears by a screen print engraved on the screen, or by a displayed line. By connecting the substrate layers to a cluster of detectors, it is possible to detect the area subjected to a pressure.

Recently, flexible screens realized on flexible supports have appeared. The patent application US2006/039031 filed by the Fuji Company and published on the 23 Feb. 2006 describes a camera with a cylindrical cavity. A flexible screen folded around an axis is placed inside the cavity, a rod fixed to the side of the screen allows the user to extract the screen from its compartment and to unfold it in order to make it visible. The photo taken by the camera is displayed on the unfolded screen. The user interface is realized by keys arranged on a rigid part connected to the flexible screen. Among the flexible screen technologies, the OLED (Organic Light Emitting Diodes) screens can be cited. The structure of an OLED device consists in an organic layer stack of a few tenths of a nanometer in thickness. Deposited on a thin and flexible support, such a structure represents a negligible depth and can thus support without damage a deformation consecutive to bending the support. But such a thin structure does not allow it to be equipped with a compressible substrate in order to render such a screen tactile. Nevertheless, the possibility to transmit a command by the simple flexion of the screen offers great navigation possibilities. As cited previously, it is known to stick resistive nets onto the flexible material. But the adhesion of resistive nets to the back of a flexible screen requires realization of the connection paths to connect them to the detectors of changes in resistance. The screen and resistive nets assembly then becomes fragile.

The document WO 2005/026938, published on 24 Mar. 2005 describes a flat tactile screen on which a user has exerted a pressure. Cells emit beams perpendicular to the surface of the screen. The user approaches his finger to the area considered, which has the effect of reflecting the light beam which as a result is propagated in the transparent substrate. A detector placed on the side enables detection of the position of the finger, this detector is for example a CCD line placed in front of lenses. Numerous detection techniques are used to determine the position of the area where the reflection is produced. All of these techniques consist in arranging a plurality of beam emitters to detect if the user is exerting a pressure in a determined area or not. These techniques impose utilization of a multiplicity of emitters and associated detectors, which results in high cost if the surface susceptible to be pressed is large.

The present invention proposes another way to detect the flexion of a screen with an improved reliability.

SUMMARY OF THE INVENTION

The purpose of the invention is a method to detect a flexion exerted on a flexible screen consisting of at least one substrate emitting a plurality of light beams and a transparent substrate crossed by a part of said light beams representative of a displayed picture;

wherein another part of the light beam is reflected within the transparent substrate to exit on at least one side of the transparent substrate, the method comprises a plurality of picture display steps associated with an area of the screen and a plurality of detection steps of the luminous amplitude of the beams exiting by at least one side of the substrate, each detection step measuring the amplitude of the beams from the displayed picture on the screen in order to determine if the area associated with the image is subjected to a flexion.

In this way, the light emitted by the screen is used to make a measurement of the light transmitted in the thickness of the screen and from it deduce the position of the area of said screen where a flexion is exerted. Each detection step being associated with a determined picture to determine the area of the screen where the flexion is exerted. In this way, it is possible to scan the screen and to determine area by area if a flexion is exerted. According to an improvement, the variation of values supplied during the screen scan enable deduction of the radius of curvature of the flexion exerted. In this way, it is possible to supply the screen management application with a new input parameter.

According to another improvement, the display of the picture for the detection of flexions occurs sufficiently rapidly to be invisible to the user, the screen displaying another picture the rest of the time. In this way, the detection of flexions is rapid and does not affect the visualization of other pictures that must be perceivable by a user. According to another improvement, these other pictures displayed define the areas on which an exerted flexion enables the introduction of a command. In this way, the screen becomes tactile by delimiting the areas that trigger actions if they are flexed.

According to another improvement, the screen also comprises optical waveguides inside the transparent substrate to guide the light beams so that they reflect within the transparent substrate towards the detectors. In this way, the detection of flexions is more precise. According to another improvement, the method comprises a calibration step during which the screen is not subjected to flexion and a measurement of the light beams reflecting inside the transparent substrate is carried out. Hence, by setting it at flat the device calculates a standard value that is then used in comparison with the values measured when the screen undergoes flexions.

According to another improvement, two groups of detectors to measure light beams reflecting inside the transparent substrate are arranged on two opposite sides of the screen, the measurements carried out by each group enable different flexions to be detected. Hence, it is possible to detect several flexions exerted on the screen. According to a particular embodiment, the screen is rectangular and has detectors on at least two opposite sides. According to another improvement, the flexible screen is arranged on a beads array itself posed on a rigid surface, the flexion consisting in deforming the screen between the beads. Hence, it is possible to define at the fabrication of the screen the areas individually flexible, by delimiting them using beads conferring rigidity to certain zones of the screen.

The purpose of the present invention is also a device comprising a flexible visualization screen of a picture, said screen comprising at least one substrate emitting a plurality of light beams representative of a displayed picture, wherein another part of the light beams reflects within the transparent substrate to exit on at least one side of the flexible screen, the device comprising detectors for the detection of the light amplitude of the beams inside the substrate, the light beams forming a plurality of pictures successively displayed on a determined area of the screen, each detector measuring the amplitude of the beam from each picture displayed on an area of the screen in order to determine if this area is subject to a flexion.

BRIEF DESCRIPTION OF THE DRAWINGS

Other characteristics and advantages of the invention will now emerge with more details, within the scope of the description that follows, of embodiments given as an example by referring to the figures attached wherein.

DETAILED DESCRIPTION

Figure 1:
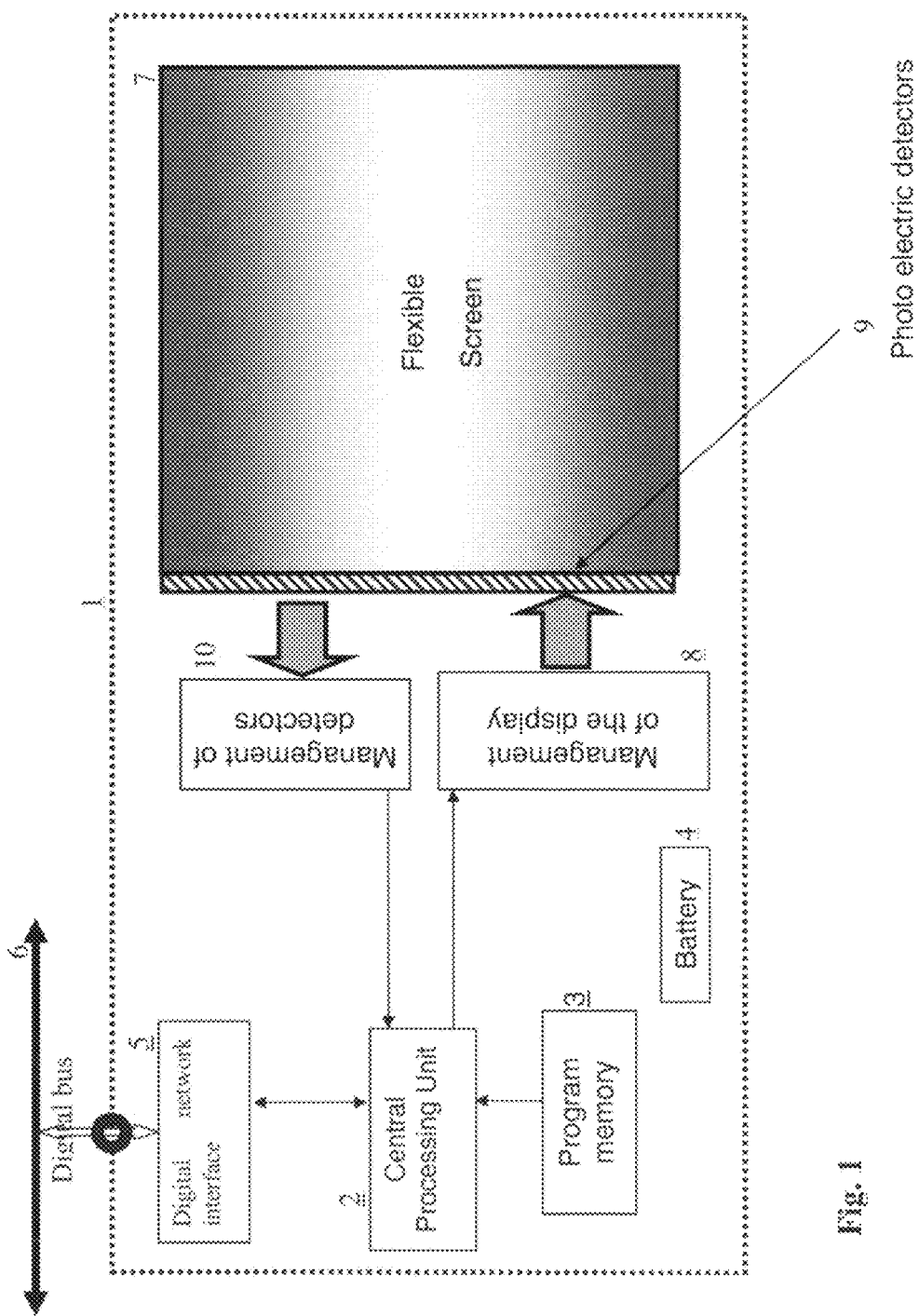
FIG. 1 is a block diagram of a command introduction device equipped with a flexible screen according to an embodiment of the invention.

With the use of FIG. 1, we first describe an example of an embodiment of the present invention in the form of a portable electronic device 1, for example a PDA or a portable television. Other devices can also be used for the present invention, for example an MP3 player, a mobile phone, a personal computer, or any device that has a display and a means to enter commands. The device 1 comprises a central processing unit 2 linked to a program memory 3 and a battery 4 conferring an autonomy of at least several hours in operation. The run program is advantageously recorded in the read-only memory. It can also be realized with the central processing unit 2 in the form of an ASIC type specialized circuit for example. The device 1 also comprises an interface 5 for communication with a high bitrate digital bus 6 allowing reception of audio and/or video data in real time.

The device 1 also has a display screen 7 realized in OLED technology. The display management is performed via a specialized circuit 8, this circuit comprises a text and graphics generator that enables the on screen display of menus, notably navigating menus, pictograms (a zoom window, icons), one or more bars of buttons, etc. The display management circuit is controlled by the Central Processing Unit 2. The screen 7 is fabricated on a flexible support allowing a certain flexibility to be conferred on it. It comprises at least two layers: a substrate emitting a plurality of light beams representative of a displayed picture and a transparent substrate crossed by a part at least of the light beams. The OLED technology allows the flexion of the screen at the same time as its operation. A specificity of OLED structures is to trap a part of the light emitted within itself and conduct it laterally. Hence the OLED structure is similar to an optical waveguide comparable to an optical fiber.

The photoelectric detectors 9, typically cells, are arranged on the side of the screen so that the incident rays that are reflecting within the transparent substrate to exit at the side, are striking directly on the photosensitive surface of the cells. The detectors 9 are electrically linked to a management circuit 10 for the conversion of analogical signals supplied by the detectors 9 into digital values that can be used by the central processing unit 2.

Figure 2:
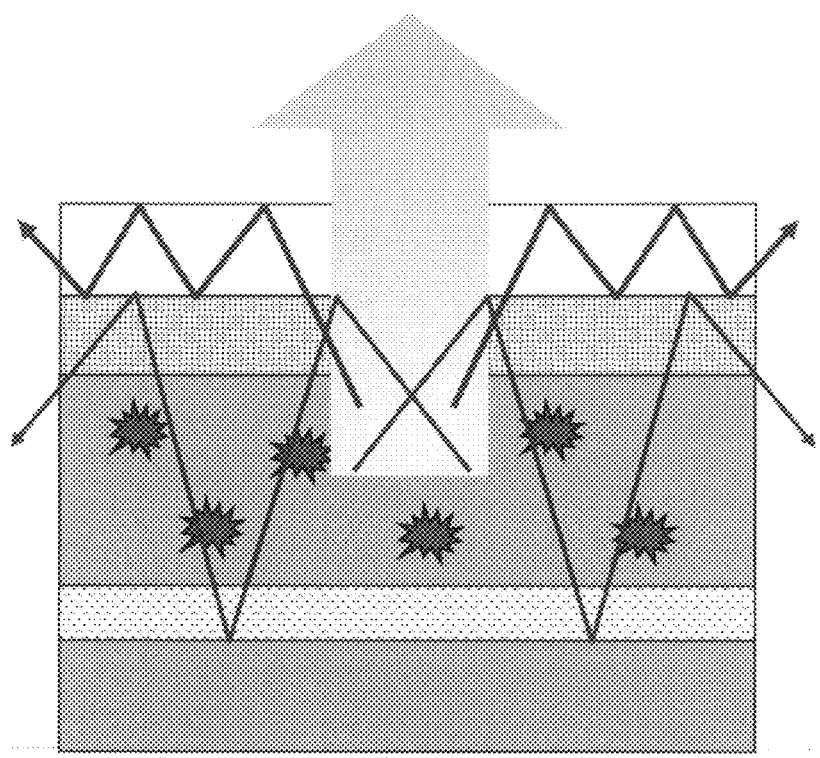
FIG. 2 is an illustration of the path taken by the light emitted by the thickness of the screen.

FIG. 2 shows the path of the light emitted by the OLED emissive substrate. It is noted that 80% of the light is captured in the substrate layers, tests have shown that the light emitted disappears in the various media according to the following proportions:

52% in the organic layers and ITO (Indium Tin Oxide),
26% in the glass substrate.
20% of the light is effectively emitted outside the screen
2% disappears due to absorption by the different materials.

As FIG. 2 shows, a part of the light is propagated in the thickness of the OLED structure on reflecting at the level of the interfaces between two layers of materials having different refraction indexes. As a result, a certain part of the light escapes by the sides of the screen. At least one photosensitive detector is disposed on the side in order to measure the part of the light that is reflected within the transparent substrate. If a flexion is applied to the screen, more light can exit from inside the screen and the fraction that falls on the detectors is weaker. The present invention consists in measuring the light that exits on the side of the screen and to deduce the characteristics of the flexion applied to said screen.

Figure 3:
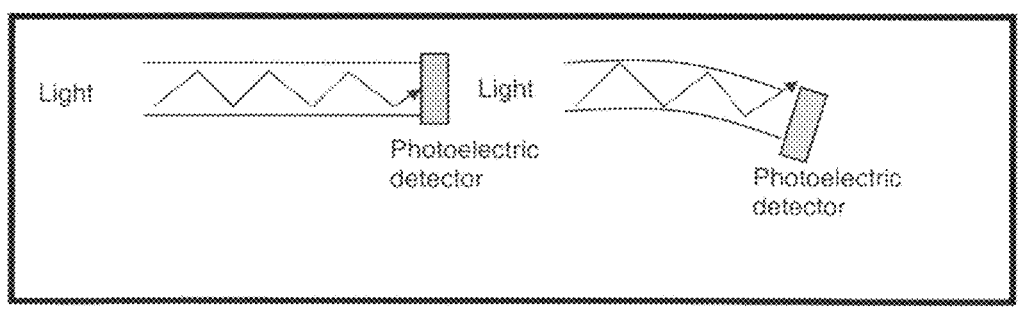
FIG. 3 is a diagram showing the propagation principle of light waves when the screen is flat and when it is flexed.

FIG. 3 illustrates the fact that if the screen is maintained at flat, the quantity of light emitted by the photo-emissive cells and transmitted inside the screen to re-exit on the side, is maximum. If however, the screen is flexed, the quantity of light diminishes because a part is able to leave the substrate by reflecting on the flexed surface according to an angle less than the angle of refraction.

The faculty to propagate the light ray between the screen layers depends upon the refractive index. The photo emissive cells are not very directive and emit the beams according to a 180° angle. When a light ray strikes a translucent surface under a certain angle with a normal direction, the angle of the refracted ray varies according to the refraction coefficient. In the case of the substrates used in the OLED screens, the light ray is emitted in a layer more refractive than the exterior layer so that if the incident ray skims the internal surface of the screen, the limit value of the refractive angle is exceeded, and the ray will be totally reflected in the substrate, we then have a case of total reflection, the two surfaces of the screen acting as waveguides. But if the screen is flexed, then the incident angle can diminish, until it is less than the angle of reflection, so that the light ray exits the substrate layer and leaves the screen. When the screen is flexed between the light emitting area and the photoelectric detectors, the light beams do not fall on the detectors. In this case, the detectors supply a minimal or null value of light amplitude received.

Figure 4:
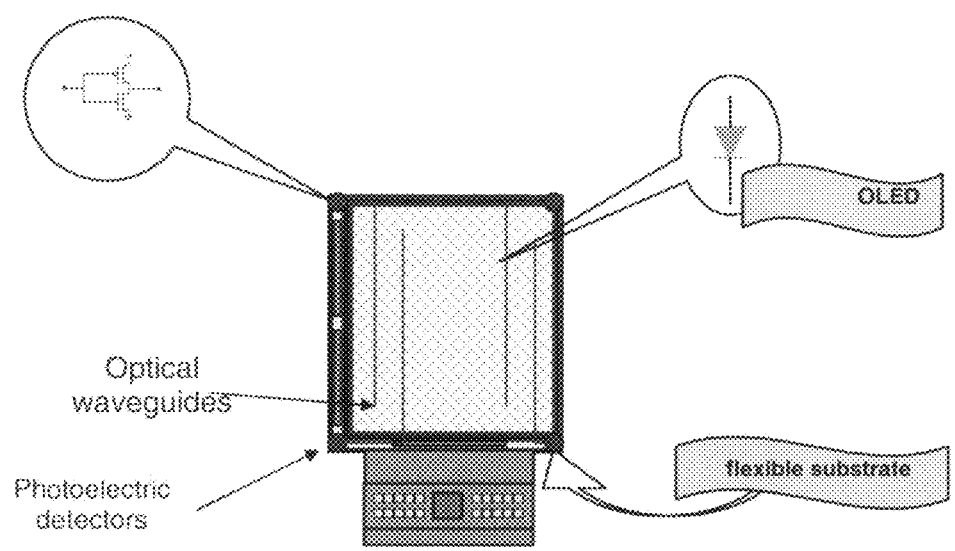
FIG. 4 is a diagram showing a screen structure with sensors in the corners of the screen.

FIG. 4 shows an embodiment of the screen 7 with photoelectric detectors 9. The screen structure has also a plurality of waveguides enabling it to guide light transmitted at the interior of the screen to the detectors 9 placed in each corner of the screen. The waveguides are structures of a thickness of less than 200 µm. The light is then guided to the detectors by these structures and the two glass plates. In the example in FIG. 4, four waveguides are arranged in the thickness of the screen and linked to four detectors. This arrangement limits the number of detectors, but also limits the detection precision of the flexions.

Other arrangements allow a complete cross-hatching of the screen by arranging a row of detectors 9 all along one side of the screen 7. Experimentation has shown that the width of a waveguide covers 5 to 25 elementary pixels. The width of a waveguide depends on the precision of the location of the flexion desired and the means with which this flexion is carried out: with hands the flexion area is at least one centimeter and the waveguide is wide. However, if the user takes a stylus (whose contact end is in the order of mm$^2$), it requires waveguides less wide and in greater numbers. These waveguides are arranged in a way that at least one end of each waveguide finds itself opposite a photoelectric detector. Advantageously, the photosensitive surface of the photoelectric detectors is of rectangular shape to marry with the shape of the waveguide. Other variants are also possible: linear, round, polygonal, etc. The photosensitive surface of the detectors varies from a few tenths of a µm$^2$ to a few square millimeters.

The interruption of the light beams enables the flexion areas to be located. To locate the interruption zone, the management circuit 8 transmits for display a graphical pattern, the management circuit 10 then analyses the light amplitude perceived by each detector. If the value supplied by a detector 9 is far below the normal value, the light beam is interrupted between the area of the screen displaying the graphical pattern and this detector 9. To accurately locate the flexion area, the central processing unit commands the display management circuit 8 to run a scan of the screen and of the detector management circuit a measurement of each change. Advantageously, the graphical pattern is a line whose width corresponds to that of a waveguide, in this way the square portions of the screen are analyzed, this give more easily exploitable results for the application that uses the flexion information.

The management circuit 10 supplies the central processing unit 2 with a table of values corresponding to the measurements realized by the detectors 9. According to the graphical pattern displayed on the screen and the values supplied by the detector management circuit, the central processing unit 2 determines the area of the screen where the flexion is situated. According to a preferred embodiment, the detectors 9 are placed on the left side of the screen 7. It turns out that for a square screen of 12 cm a side, a matrix of 10 by 10 is sufficient to identify the flexed areas of the screen. The screen is divided into ten lines and ten columns, one hundred areas are thus clearly separated. According to this example, one column corresponds to one tenth of the screen, as a result an illuminated line is at most one tenth of the width of the screen. The scan is carried out from left to right, the first scan consists in illuminating the column 1 situated on the extreme left of the screen. The detectors 9 send a first group of ten values to the central processing unit, each value corresponds to a line. The value supplied by each of the ten detectors is proportional to the quantity of light received. After column 1, the second column 2 that is situated to the right of the first is illuminated, and so on, as far as the last column 10, on the right side of the screen. When all the measurements have been made, the working memory contains ten groups of ten values.

Here follows a table of values supplied by the detectors following a scan of the ten columns.

TABLE 1

| Col. 1 | Col. 2 | Col. 3 | Col. 4 | Col. 5 | Col. 6 | Col. 7 | Col. 8 | Col. 9 | Col. 10 |
|---|---|---|---|---|---|---|---|---|---|
| 10 | 10 | 10 | 9  | 8 | 1 | 1 | 1 | 1 | 1 |
| 10 | 10 | 10 | 10 | 9 | 1 | 1 | 1 | 1 | 1 |
| 10 | 10 | 10 | 9  | 8 | 1 | 1 | 1 | 1 | 1 |
| 10 | 10 | 10 | 9  | 8 | 1 | 1 | 1 | 1 | 1 |
| 10 | 10 | 10 | 9  | 8 | 1 | 1 | 1 | 1 | 1 |
| 10 | 10 | 10 | 10 | 8 | 1 | 1 | 1 | 1 | 1 |
| 10 | 10 | 10 | 9  | 8 | 1 | 1 | 1 | 1 | 1 |
| 10 | 10 | 10 | 9  | 8 | 1 | 1 | 1 | 1 | 1 |
| 10 | 10 | 10 | 2  | 9 | 1 | 1 | 1 | 1 | 1 |
| 10 | 10 | 10 | 10 | 8 | 1 | 1 | 1 | 1 | 1 |

The central processing unit 2 analyses for a given line, the value deviations between one column and the next, and then looks for the column where the values present the greatest deviation with the preceding column. In the example illustrated by the table, the values of column 5 have the most variation with the values of the following column 6. Indeed, when columns 1, 2, 3, 4 and 5 are illuminated, the detectors situated on the left receive all the light transmitted across the screen because the luminous amplitude value is maximum. From column 6, the quantity of light received is quasi-null. The light is therefore interrupted by a continuous and vertical flexion that is situated at the level of column 5. The application that manages the screen display takes into account the position of the detected flexion and modifies the picture displayed according to the position of the detected flexion. The scan of the screen is carried out in a short moment so as not to be detectable by the user, typically each column is illuminated for a millisecond, the scan lasts 10 milliseconds and occurs just once per second. Therefore, the scan occupies only 1% of time and is thus undetectable to the user. For finer resolutions, for example a scan of one hundred columns, it is necessary to reduce the duration of the illumination of a column so as to maintain the complete scan around the value of 10 milliseconds.

In this way, the central processing unit 2 determines the areas of the screen subjected to flexions If the device 1 possesses a mobile television function, the run program in the memory 3 comprises an Electronic Program Guide application allowing the user to select audiovisual programs. The programs transmitted by the digital bus 6 and received by the interface 5 can be selected by a list displayed on the screen 7. A flexion at the zone where the program identifier is displayed allows selection of the program.

To guarantee the reliability of the measurement, one technique among others consists in performing a learning operation. Initially, the user activates the screen learning step by a menu, this triggers the following message: "learning in 3 seconds, place the screen perfectly flat". The user then takes care to place the screen on a flat surface so as to eliminate all the flexions. After three seconds, a scan is carried out to measure the value of the detectors for each column when the screen is not flexed. The central processing unit thus memorizes a reference table of detector values, this table has a structure identical to that of table 1. Then, during a scan in normal operation, the central processing unit compares the current value measured by the detectors with the corresponding reference value calculating the ratio | (value measured×10)/reference value|. The results of the calculations are put in the table 1 and processed to determine the flexion zone.

The screen and its measurement device also allow one-off presses on the screen to be detected. The user places the screen on a soft surface (in plastic) and presses on a particular region of the screen using his finger or a stylus. Instead of detecting a flexion on a column, the central processing unit detects a flexion on a small area of the screen. Table 2 shows such a case:

TABLE 2

| Col. 1 | Col. 2 | Col. 3 | Col. 4 | Col. 5 | Col. 6 | Col. 7 | Col. 8 | Col. 9 | Col. 10 |
| --- | --- | --- | --- | --- | --- | --- | --- | --- | --- |
| 10 | 10 | 10 | 10 | 10 | 10 | 10 | 10 | 10 | 10 |
| 10 | 10 | 10 | 10 | 10 | 10 | 10 | 10 | 10 | 10 |
| 10 | 10 | 10 | 10 | 10 | 10 | 7 | 2 | 1 | 1 |
| 10 | 10 | 10 | 10 | 10 | 10 | 8 | 1 | 1 | 1 |
| 10 | 10 | 10 | 10 | 10 | 10 | 10 | 10 | 10 | 10 |
| 10 | 10 | 10 | 10 | 10 | 10 | 10 | 10 | 10 | 10 |
| 10 | 10 | 10 | 10 | 10 | 10 | 10 | 10 | 10 | 10 |
| 10 | 10 | 10 | 10 | 10 | 10 | 10 | 10 | 10 | 10 |
| 10 | 10 | 10 | 10 | 10 | 10 | 10 | 10 | 10 | 10 |
| 10 | 10 | 10 | 10 | 10 | 10 | 10 | 10 | 10 | 10 |

In the example illustrated by table 2, the values of column 7 have more deviation with the values of the next column 8, but only for lines 3 and 4 numbered from the top of the screen. Therefore, the central processing unit deduces that the screen is deformed on an area located at the top right of the screen 7.

The central processing unit 2 runs an application recorded in the memory 3. This application displays menus and graphics on the screen that delimit the areas. The user exerts a flexion on these areas in order to introduce the commands. For example, a photographic processing application displays a picture and according to the flexions exerted on the screen, the picture is deformed. An example consists in that the user bends the screen towards himself in order to cause a zoom on the part of the photo centered by the flexion area. The detection method of flexion areas can also detect the characteristics of the flexion, for example the radius of curvature. If the variation of values from one column to another is abrupt, the radius of curvature is very pronounced. For a screen 10 cm wide, a variation of values from "2" to "9" between two consecutive columns corresponds to a radius of curvature of 1 cm, if the variation varies from "2" to "9" on four columns, the radius is approximately 4 cm. As a result, the central processing unit uses the radius of curvature as an input parameter, for example the radius of curvature defines the enlargement value of the zoom for the aforementioned application.

According to an improvement, the detectors are disposed on each side of the screen, in this way it is possible to detect several flexions. The table of values following a scan of ten columns contains pairs of values supplied by the detectors 9 on the left (1$^{st}$ value) and on the right (2$^{nd}$ value). Here is an example of a table of values in the case where two flexions are exerted on the screen:

TABLE 3

| Col. 1 | Col. 2 | Col. 3 | Col. 4 | Col. 5 | Col. 6 | Col. 7 | Col. 8 | Col. 9 | Col. 10 |
| --- | --- | --- | --- | --- | --- | --- | --- | --- | --- |
| 10/1 | 10/1 | 9/1 | 1/1 | 1/1 | 1/1 | 1/2 | 1/4 | 1/9 | 1/10 |
| 10/1 | 10/1 | 8/1 | 1/1 | 1/1 | 1/1 | 1/5 | 1/8 | 1/8 | 1/10 |
| 10/1 | 10/1 | 9/1 | 1/1 | 1/1 | 1/1 | 1/5 | 1/8 | 1/8 | 1/10 |
| 10/1 | 10/1 | 9/1 | 1/1 | 1/1 | 1/1 | 1/4 | 1/9 | 1/9 | 1/10 |
| 10/1 | 10/1 | 9/1 | 1/1 | 1/1 | 1/1 | 1/5 | 1/9 | 1/9 | 1/10 |

TABLE 3-continued

| Col. 1 | Col. 2 | Col. 3 | Col. 4 | Col. 5 | Col. 6 | Col. 7 | Col. 8 | Col. 9 | Col. 10 |
| --- | --- | --- | --- | --- | --- | --- | --- | --- | --- |
| 10/1 | 10/1 | 9/1 | 2/1 | 1/1 | 1/1 | 1/2 | 1/4 | 1/8 | 1/10 |
| 10/1 | 10/1 | 9/1 | 1/1 | 1/1 | 1/1 | 1/1 | 1/4 | 1/8 | 1/10 |
| 10/1 | 10/1 | 9/1 | 1/1 | 1/1 | 1/1 | 1/1 | 1/5 | 1/9 | 1/10 |
| 10/1 | 10/1 | 8/1 | 2/1 | 1/1 | 1/1 | 1/1 | 1/4 | 1/8 | 1/10 |
| 10/1 | 10/1 | 9/1 | 1/1 | 1/1 | 1/1 | 1/2 | 1/4 | 1/8 | 1/10 |

In the example illustrated by table 3, the values of column 3 supplied by the detectors 9 on the left of the screen 7 have the most variation with the values of the next column 4, the central processing unit therefore deduces the existence of a first flexion at the level of column 3, the radius of curvature is short. The values of columns 7, 8, and 9 supplied by the detectors 9 on the right of the screen 8 also show variations, the central processing unit therefore deduces a second flexion centered on the column 8, as the variations concern three columns, it is deduced that the radius of curvature is large.

According to a preferred embodiment, the OLED type screen is fixed with two handles on the left and the right so that by holding the handles, the user can exert a flexion on the screen. Other embodiments of the present invention are also possible, as for example a digital photo device comprising a compartment supporting the objective and containing the OLED screen that folds around an axis. The user extracts the screen from the compartment by pulling on the side and introduces commands by exerting flexions on it.

Figure 5:
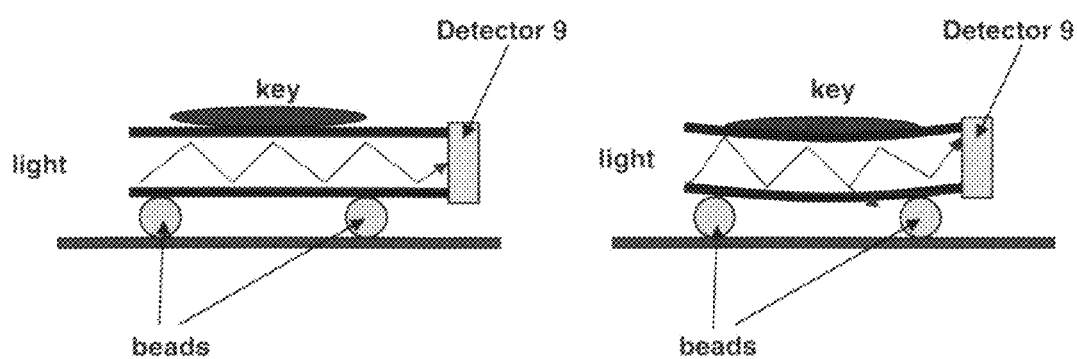
FIG. 5 shows another example of a flexible screen structure on which flexions are exerted.

FIG. 5 presents another embodiment of the present invention where the flexible screen is arranged on a beads array itself posed on a rigid surface. A user exerts a pressure on an area situated between two beads, which deform the screen by subjecting it locally to a flexion. The photoelectric detector placed on the side measures the flexion applied to the screen.

While the present invention was described in reference to particular illustrated embodiments, said invention is in no way limited to these embodiments, but only by the appended claims. Other changes or modifications to the embodiments previously described can be contributed by those in the profession, without leaving the framework of the present invention.

The invention claimed is:

1. A method for detecting a flexion exerted on a flexible screen, said method comprising:
   providing said flexible screen comprised of at least one organic light emitting diode (OLED) substrate emitting a plurality of light beams and a transparent substrate traversed by a part of said light beams representative of a displayed picture, wherein said flexible screen is divided into a plurality of columns and a plurality of rows representing a plurality of cells, and wherein each one of said cells provides values in response to a scanning process associated with said flexible screen;
   performing said scanning process by successively illuminating each of said columns via said light beams emitted by said at least one emitting substrate in a sequential manner beginning from a first side of said flexible screen;
   providing at least one detector arranged on one side of said flexible screen for detecting said values provided by said cells; and
   identifying a first one of said columns, where a deviation between said values from said first column to an adjacent said first column is greatest, as being associated with said flexion.

2. The method according to claim 1, further comprised of analyzing said values to determine a radius of curvature of said flexion.

3. The method according to claim 1, wherein said illumination is performed so as not to be visible to a user, and said flexible screen displays images visible to said user when said illumination is not performed.

4. The method according to claim 3, wherein at least one of said images allows said user to input a command by applying a flexion to a location on said flexible screen.

5. The method according to claim 1, wherein said flexible screen comprises at least one optical waveguide placed within said transparent substrate of said flexible screen to guide light beams emitted by said at least one emitting substrate during said illumination so that said light beams reflect inside said transparent substrate and are received by said at least one detector.

6. The method according to claim 1, further comprised of calibrating said flexible screen by measuring light beams reflecting within said transparent substrate of said flexible screen while said flexible screen is not subjected to a flexion.

7. The method according to claim 1, wherein said flexible screen is part of an electronic device capable of providing at least one of an audio and video output.

8. The method according to claim 1, wherein said flexible screen is arranged on an array of beads posed on a rigid surface, and said flexion includes deforming said flexible screen between said beads.

9. A device, comprising:
a flexible screen comprised of at least one organic light emitting diode (OLED) substrate emitting a plurality of light beams and a transparent substrate traversed by a part of said light beams representative of a displayed picture, said flexible screen having a plurality of columns and a plurality of rows representing a plurality of cells, wherein each one of said cells provides values in response to a scanning process associated with said flexible screen;
means for performing said scanning process by successively illuminating each of said columns via said light beams emitted by said at least one emitting substrate in a sequential manner beginning from a first side of said flexible screen;
means for detecting said values in response to said illumination, wherein said detecting means are arranged on one side of said flexible screen along one of said columns; and
means for identifying a first one of said columns, where a deviation between said values from said first column to an adjacent said first column is greatest, as being associated with a flexion exerted on said flexible screen.

10. The device according to claim 9, further comprising means for analyzing said values to determine a radius of curvature of said flexion.

11. The device according to claim 9, wherein said illumination is performed so as not to be visible to a user, and said flexible screen displays images visible to said user when said illumination is not performed.

12. The device according to claim 9, wherein said flexible screen comprises one or more optical waveguides inside said transparent substrate of said flexible screen to guide light beams during said illumination so that said light beams reflect inside said transparent substrate and are received by said detecting means.

13. The device according to claim 9, wherein said flexible screen is calibrated by measuring light beams reflecting within said transparent substrate of said flexible screen while said flexible screen is not subjected to a flexion.

14. The device according to claim 9, wherein said device provides at least one of an audio and video output.

15. The device according to claim 9, wherein said flexible screen is arranged on an array of beads posed on a rigid surface, and said flexion includes deforming said flexible screen between said beads.

16. A device, comprising:
a flexible screen comprised of at least one organic light emitting diode (OLED) substrate emitting a plurality of light beams and a transparent substrate traversed by a part of said light beams representative of a displayed picture, said flexible screen having a plurality of columns and a plurality of rows representing a plurality of cells, wherein each one of said cells provides values in response to a scanning process associated with said flexible screen, and said scanning process is performed by successively illuminating each of said columns via said light beams emitted by said emitting substrate in a sequential manner beginning from a first side of said flexible screen;
at least one detector positioned on one side of said flexible screen along one of said columns and being operative to detect said values in response to said illumination; and
a processor operative to identify a first one of said columns, where a deviation between said values from said first column to an adjacent said first column is greatest, as being associated with a flexion exerted on said flexible screen.

17. The device according to claim 16, wherein said processor is further operative to analyze said values to determine a radius of curvature of said flexion.

18. The device according to claim 16, wherein said flexible screen comprises at least one optical waveguide inside said transparent substrate of said flexible screen to guide light beams emitted by said at least one emitting substrate during said illumination so that said light beams reflect inside said transparent substrate and are received by said at least one detector.

19. The device according to claim 16, wherein said flexible screen is calibrated by measuring light beams reflecting within said transparent substrate of said flexible screen while said flexible screen is not subjected to a flexion.

20. The device according to claim 16, wherein said flexible screen is arranged on an array of beads posed on a rigid surface, and said flexion includes deforming said flexible screen between said beads.

* * * * *